May 24, 1949.   R. E. HALL ET AL   2,471,034
FLUIDIZED CATALYTIC CONVERSION OF HYDROCARBONS
Filed April 30, 1947
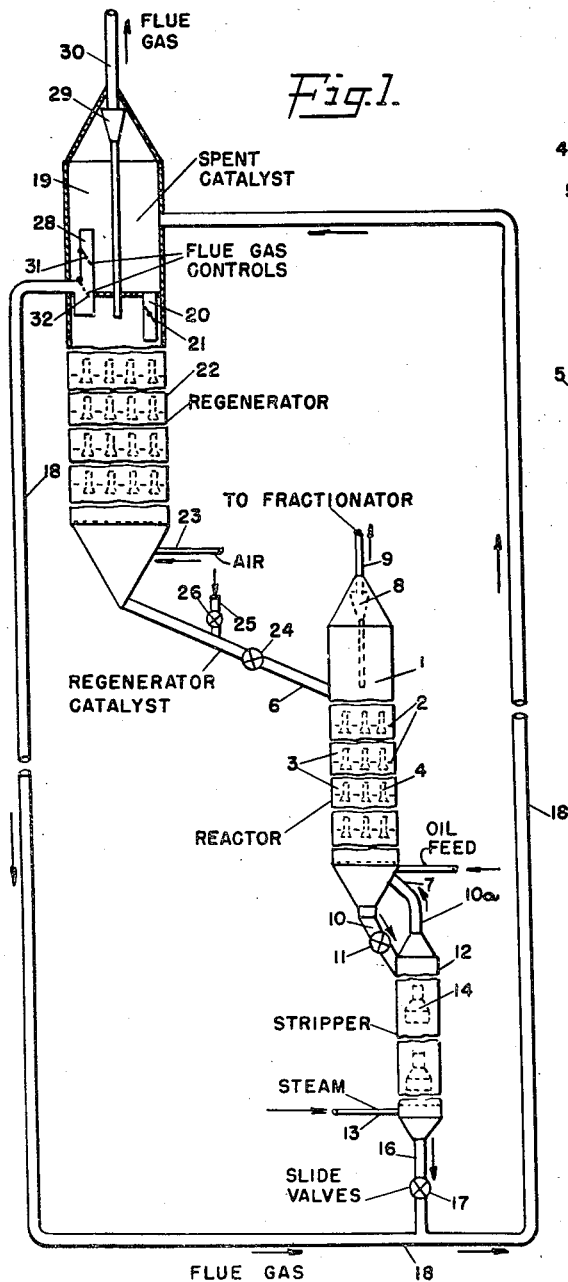
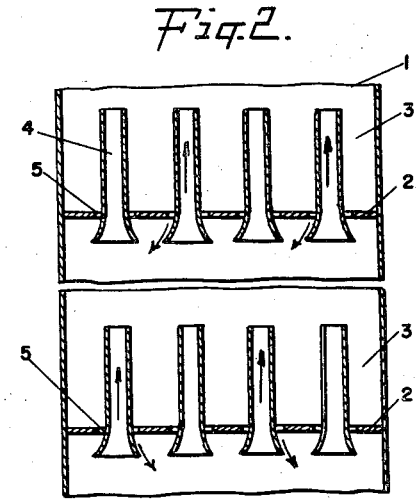
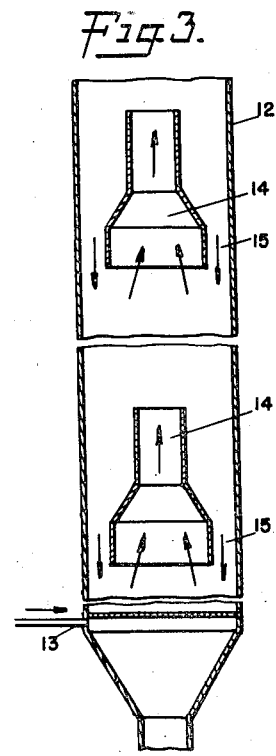
INVENTORS
RALPH ELDEN HALL AND
MARION JAMES WILCOX
BY
ATTORNEYS Patented May 24, 1949

2,471,034

UNITED STATES PATENT OFFICE 2,471,034

FLUIDIZED CATALYTIC CONVERSION OF HYDROCARBONS

Ralph E. Hall, East Chicago, Ind., and Marion J. Wilcox, Harvey, Ill., assignors to Sinclair Refining Company, New York, N. Y., a corporation of Maine Application April 30, 1947, Serial No. 745,038

5 Claims. (Cl. 196—52)

This invention relates to the pyrolytic conversion of hydrocarbons and, more particularly, to pyrolytic conversion processes involving the use of a finely divided catalyst. The invention provides an improvement process of increased catalytic efficiency and also a novel apparatus particularly adapted to the carrying out of the process.

The invention is especially applicable to conversion processes of the general type wherein a finely divided catalyst is brought into intimate contact with the vaporized hydrocarbons to be converted in a reaction zone, spent catalyst is separated from the oil vapors, the separated catalyst stripped of oil by contact with a gaseous stripping medium, the catalyst regenerated by decarbonization, and the regenerated catalyst returned to the reaction zone for contact with further hydrocarbon vapors to be converted.

Operations of the type described are commonly designated fluid catalyst processes. In conventional operation, the spent catalyst from the reaction zone is stripped by contact with steam in the stripping zone, the carbon deposited on the catalyst particles is burned off by contact with air in the regenerating zone, and the regenerated catalyst in fluid suspension is returned to the reaction zone.

An important consideration in operations of this type, from a practical aspect, is the efficient utilization of the catalyst. For maximum efficiency, it is necessary that all of the catalyst be utilized to an equal extent in the reaction zone and passed to the regenerator and that in the regenerator all of the catalyst be uniformly regenerated and returned to the reaction zone.

In operations of this type, the catalyst is usually maintained throughout the operation in a fluidized condition. However, the catalyst is normally not of uniform density throughout the various stages of the operation. In both the reaction zone and the regenerating zone and also in the stripping zone there is maintained a so-called "high density" or "dense phase" body of catalyst of considerable depth through which the gases and vapors pass and above which the catalyst in relatively low concentration is suspended in the ascending gases or vapors.

In conventional operation, these dense phase bodies of catalyst are in a continuously turbulent state. Because of this condition, there is a mixing of the catalyst resulting in a heterogeneous mass of catalyst in the beds. While this is beneficial from a temperature-control viewpoint, an advantage of fluidized technique in catalytic conversion, there is an inherent disadvantage in that the fresh incoming catalyst, partially spent catalyst and spent catalyst, in the case of the reactor, become intermixed in the catalyst bed. When catalyst is withdrawn from the bed for regeneration, this heterogeneous mixture is taken off and not a truly spent catalyst. Also due to the intermixing of the fresh and spent catalyst, the average effective activity of the catalyst in the bed is less than if spent catalyst were not also present.

Similarly, in the stripper and in the regenerator a more complete stripping and burning off of the oil and carbonaceous material from the catalyst, respectively, would be possible if it were not for the mixing of the stripped and unstripped and regenerated and partially regenerated catalyst in the respective zones.

Further, the catalyst-vapor contacts in the reactor and the stripper and the contact between the catalyst and regenerating gases in the regenerator are not as intimate and uniform as desirable. In the turbulent beds of catalyst there is a tendency for large globules of the vapors or gases to pass upwardly through the catalyst bed without coming into intimate contact with the catalyst.

In our copending application Ser. No. 745,036 filed concurrently herewith, we have disclosed and claimed an improved method of avoiding, to a major extent at least, objectionable intermixing of the catalyst in different stages of activity and for effecting more uniform contact between the catalyst and the vapors, or gases, while maintaining the fluidized principle of operation. In the process and apparatus therein described, this is accomplished by interrupting the relatively dense phase of the beds of catalyst in the respective contact zones by alternate zones of less catalyst density, in which the catalyst, in relatively low concentration, is entrained in one or more upwardly rising restricted streams of vapors, or gases, of increased velocity, and permitting a portion of the catalyst to gravitate from a higher to a lower zone through annular spaces surrounding the upwardly rising gaseous streams.

In the particular operation therein described, the catalyst in fluidized suspension is introduced into the lower ends of the reaction zone and regenerating zone, respectively, and is passed upwardly therethrough, the catalyst and gaseous medium being withdrawn from the upper portion of the respective contact zones.

The respective contact zones therein described, and herein also described in detail, are divided into a series of compartments by chimney trays, adjacent compartments being connected by the chimneys extending vertically through uniformly disposed openings in the tray of such size as to provide an annular opening surrounding the respective chimneys.

In the operation, according to our copending application, the catalyst is carried upwardly into the respective contact zones in fluid suspension and in its passage therethrough, the catalyst tends to drop out of suspension, forming a relatively dense phase body of catalyst on the respective trays. From these dense phase bodies, catalyst flows downwardly through the annular spaces surrounding the chimneys, the downwardly flowing catalyst being caught up by the ascending vapors and carried upwardly to the next higher zone, finally reaching the upper zone of the chamber from which it is withdrawn.

In that method of operation, the amount of catalyst carried upwardly by the vapors from a lower to a higher zone is equal to the amount of catalyst introduced with the gases, or vapors, entering the chamber, plus the amount of catalyst flowing from the higher zone to the lower zone through the annular openings. The amount of catalyst which the vapors will carry upwardly through the chimneys is limited and, in practical operation, the amount of catalyst will not exceed about twice that introduced to the chamber. Accordingly, the amount of catalyst which may be returned from a higher to a lower zone through the annular spaces should not exceed the amount of catalyst being continuously introduced into the lower portion of the chamber.

The circulation of the catalyst from a higher zone to a lower zone and resuspension of the catalyst in the rising vapors has distinct advantages in that it permits more thorough, prolonged and uniform contact between the catalyst and the rising vapors. It is desirable to increase the amount of catalyst so circulated.

The present invention provides an improved method of operation whereby the amount of catalyst circulated from a higher to a lower zone within the contact chamber may be materially increased. This is accomplished by our present process by reversing the general direction of flow of the catalyst through the chamber so that the catalyst enters the upper portion of the chamber and is withdrawn from the lower end thereof, the vapors, or gases, being introduced into the lower end of the chamber and withdrawn from the upper end thereof.

Our present invention has the further advantage of countercurrent flow through the contact zones as well as practically doubling the amount of catalyst which may be circulated from a higher to a lower zone.

The invention provides an improved process adapted to continuous operation and comprising a plurality of cooperating steps so coordinated as to constitute a unitary operation in which a charge of catalyst is repeatedly used, intermittently regenerated and returned to the reaction zone and in which increased catalytic efficiency and catalyst life is attained.

The invention also provides improvements in the conveyance of the catalyst through the system whereby the use of air and steam as conveying media is avoided.

The invention will be more fully described and illustrated with reference to the accompanying drawings of which Figure 1 represents conventionally and diagrammatically a flow diagram of a fluid catalyst cracking process embodying my invention. Figure 2 is an enlarged fragmentary view of the interior arrangement of both the reactor and regenerator and Figure 3 is an enlarged fragmentary view showing the interior of the stripper.

Referring more particularly to Figure 1 of the drawings, the apparatus indicated by the reference numeral 1 represents a generally cylindrical reactor provided internally with a plurality of trays 2 extending entirely across the reactor and dividing the lower and intermediate portions of the reactor into a plurality of zones 3. The trays 2 are provided with a plurality of uniformly spaced circular openings and, as more clearly appears from Figure 2 of the drawings, there is suspended in each of the openings, by suitable brackets or the like not shown, a chimney 4 of somewhat smaller outer diameter than the diameter of the opening in the tray so as to provide an annular space 5 surrounding the chimney. These chimneys extend through the openings in the trays from a distance well above the tray to somewhat below the tray and are flared outwardly at their lower ends.

The catalyst passes by gravity to the upper zone of the reactor through conduit 6 and forms a relatively dense phase body of catalyst on the upper tray which passes downwardly through the annular spaces 5 forming a relatively dense bed of catalyst on each of the lower trays.

The hydrocarbon to be converted is introduced in vapor phase through line 7 leading to the lower portion of the reactor and passes upwardly therethrough countercurrent to the downwardly gravitating catalyst. After passing through each of the trays of the reactor, the vapors pass from the top thereof through cyclone type separator 8, for removal of suspended catalyst, the latter dropping back into the reactor and the vapors pass out through line 9 to a fractionator, not shown.

In operation, a relatively dense phase, fluidized body of catalyst, say, of a density af about 50 to 60 pounds per cubic foot, will be formed on the respective plates for a depth equal to the height of the chimneys above the tray. In the zones of the reactor between the top of a lower chimney and the lower end of the next higher chimney, there will be maintained a body of somewhat lower catalyst density, say, 25 to 35 pounds per cubic foot, due to the upward passage of the vapors therethrough. The concentration of catalyst in the streams of vapor passing upwardly through the chimneys will be still less, say, about 2 to 12 pounds per cubic foot. Thus, the catalyst will be repeatedly dispersed in the vapors in the respective zones of the reactor, affording thorough and uniform contact between the catalyst and the vapors. Though the catalyst is repeatedly circulated in the respective zones, such intermixing as occurs is primarily of catalyst of relatively similar catalytic activity, objectionable top-to-bottom mixing of the catalyst being minimized.

The summation of the depths of the bodies of catalyst between the tops of lower chimneys and the bottoms of the next higher chimneys may, with advantage, be about that of the customary depth of the catalyst bed in conventional operation. However, due to more thorough contact between the catalyst and the hydrocarbon vapors, somewhat less depth will generally be found effective to accomplish comparable results.

As previously noted, the catalyst passes downwardly through the annular spaces 5 from a higher to a lower zone of less density and, in so doing, a portion of the descending catalyst is picked up by the rising stream of vapors and carried therewith upwardly through the chimneys into the next higher zone. Accordingly, the effective path of the catalyst through the reactor in intimate contact with the oil vapors is materially increased.

Also, the vapors, in passing upwardly through the reactor, are periodically broken up into a plurality of small streams uniformly spaced throughout the transverse area of the reactor, thus avoiding the channelling of vapors through the catalyst bed.

Spent catalyst flows by gravity from the lower end of the reactor through conduit 10, controlled by valve arrangement 11 of conventional type, into the upper part of the stripper 12 and passes generally downwardly therethrough countercurrent to steam or other stripping medium introduced into the lower part of the stripper through line 13. As more clearly shown in Figure 3 of the drawings, the stripper is provided with a plurality of chimneys 14 centrally positioned within the stripper. These chimneys are likewise flared at their lower end and are of such maximum dimension as to provide an annular space 15 between the chimney and the outer walls of the stripper. Steam and stripped hydrocarbons pass up through conduit 10a into the reactor.

In passing downwardly through the stripper, the catalyst forms a relatively dense phase bed surrounding the chimneys and of a height approximating that of the chimneys and passes downwardly through annular spaces 15 countercurrent to the rising steam. As described, with reference to the reactor, a portion of the downwardly flowing catalyst is caught up by the current of steam and carried upwardly through the chimney and redeposited in the zone above.

The method and apparatus for stripping the catalyst are the subject of our copending application Serial No. 745,037 filed concurrently herewith.

The spent catalyst is withdrawn from the lower portion of the stripper through conduit 16, the flow being controlled by a slide valve arrangement 17, and passes by gravity into conduit 18 where it is caught up by a stream of hot flue gases from the regeneration, subsequently described, and carried up into the spent catalyst hopper 19 from which it passes downwardly through standpipe 20, controlled by valve 21, into the regenerator 22.

The regenerator 22 is provided with chimney trays, such as described with reference to the reactor, and the catalyst passes downwardly therethrough substantially as described with reference to the reactor, generally countercurrent to an upwardly flowing stream of air, or other oxidizing gases, introduced into the lower portion of the regenerator through line 23. Regenerated catalyst passes from the lower portion of the regenerator to the upper zone of the reactor, as previously described, through conduit 6 which is, with advantage, controlled by a slide valve 24. The catalyst within the system is supplemented as required by fresh catalyst introduced through line 25 controlled by valve 26.

The products of combustion—that is, flue gases—rise to the upper zone of the regenerator and pass therefrom through flue 28 to the spent catalyst hopper and from thence through cyclone type separator 29 and out through conduit 30 to a precipitator, or stack, not shown. Conduit 18 opens into flue 28 and a portion of the flue gas is diverted through conduit 18 for conveying the catalyst to the spent catalyst hopper, as previously described. All, or a portion, of the flue gases may be thus diverted into conduit 18 by appropriate adjustment of valve 31, the valve being adapted to hold a pressure in the regenerator sufficiently higher than that of the hopper to force the flue gas through conduit 18. The passage of the flue gases upwardly through the flue 28 may also be controlled by adjustment of valve 32 in the lower part of the flue.

In passing through the regenerator in contact with air, the carbonaceous material deposited on the catalyst is uniformly burned off. Conventional means for preventing excessive temperatures in the regenerating zone may be provided.

The chimney-tray should be so designed and proportioned with respect to the transverse dimension of the chamber and the amount of the gaseous medium to be passed upwardly through the chamber that the gaseous medium passes upwardly at a superficial velocity within the range of 0.3 to 1.5 feet per second, in the enlarged zones between the trays, and at a superficial velocity through the chimneys within the range of 3.5 to 7 feet per second. By selection of the proper chimney diameters, lengths, bottom bell diameters and areas of annular openings, surrounding the chimneys, it is possible to obtain ratios of total chimney area to total tray area of 1:3.5 to 1:15 to obtain the desired velocity range noted above.

The chimney height may vary from, say 12 to 18 inches, the height of the chimney above the tray being from 9 to 12 inches. The selection of the size of the annular openings and the bell diameters will depend upon the desired downflow rate of the catalyst from zone to zone. However, the bell diameter should be equal to, or greater than, the diameter of the annular opening in the tray. Thus, by adjustment of the upflow and downflow rates of catalyst, a greater or less extent of recirculation of the catalyst from a lower to a higher zone may be attained approaching the full carrying capacity of the ascending gases or vapors.

The distance between trays will depend primarily upon the number of zones desired and the total bed height of catalyst in the vessel. Within the range of conditions noted above, the catalyst loading of the upflow vapors will vary from 2.5 to 12 pounds of catalyst per cubic foot of gaseous medium and the downflow of catalyst through the annular openings will be within the range of 0.25 to 0.50 ton per square foot per minute.

Usually, it is desirable to employ at least three trays in the reactor and regenerator, respectively. More than three trays is usually desirable, say, 3 to 10 trays. Usually, at least 3 trays are desirable in the stripper.

The catalyst employed may be of the type conventionally used in fluid catalyst processes, for instance, a silica-alumina type catalyst in finely divided or powdered form. The reaction conditions may likewise be those conventionally used in operations of this type, and as understood by the art, the optimum temperatures and pressures will depend primarily upon the type of feed stock used, the particular catalyst employed and the raction desired. In cracking gas oil, for instance, the reaction temperature may, with advantage, be within the range of 800° to 1,000° F. and the pressure at the top of the reactor within the range of about 5 to 25 pounds per square inch. The regeneration temperature may be within the range of about 950° to 1,200° F., heat for the reaction being supplied largely by the hot catalyst passing to the charge oil from the regenerator.

It will be understood that the present invention is not restricted to the particular embodiment thereof herein described but is applicable to various modifications of fluid catalyst processes.

We claim:

1. In a fluid catalyst process for the conversion of hydrocarbons wherein a gaseous medium is passed upwardly in contact with a dense phase fluidized body of the catalyst in a contact zone, the step of maintaining in the contact zone a plurality of dense phase fluidized bodies of the catalyst interposed between alternate vertically spaced zones of lower catalyst density in which the catalyst in relatively low concentration is entrained in an upwardly rising restricted stream of the gasous medium of substantial height, introducing catalyst to the upper portion of the contact zone, permitting the catalyst to gravitate downwardly from a higher zone to the next lower zone through an annular space surrounding the upwardly rising gaseous stream, and withdrawing catalyst from a lower portion of the contact zone.

2. In the fluid catalyst process for the conversion of hydrocarbons wherein the hydrocarbon to be converted is passed upwardly in vapor phase in contact with a dense phase fluidized body of the catalyst in a reaction zone, the catalyst separated from the hydrocarbon vapors stripped of absorbed hydrocarbons by passing a gaseous stripping medium upwardly through a dense phase fluidized body of the separated catalyst in a stripping zone and the stripped catalyst is regenerated by passing an oxidizing gas upwardly through a dense phase fluidized body of the stripped catalyst in a regenerating zone, the improvement which comprises introducing the catalyst into the upper portion of the reaction, stripping and regenerating zones, respectively, permitting the catalyst to gravitate generally downwardly therethrough forming a plurality of dense phase fluidized bodies having interposed between such bodies alternate vertically spaced zones of lower catalyst density in which the catalyst in relatively low concentration is entrained in an upwardly rising restricted stream of the gaseous medium of substantial height, permitting the catalyst to gravitate downwardly from a higher dense phase body to the next lower zone through an annular space surrounding the upwardly rising gaseous stream and withdrawing catalyst from the lower portions of the respective zones.

3. A fluid catalyst process for the conversion of hydrocarbons including the following steps— passing the catalyst into the upper portion of a vertically elongated reaction chamber of a relatively large transverse dimension and permitting it to gravitate downwardly through the chamber, passing a gaseous medium upwardly through said chamber through a plurality of alternate zones of low velocity and of high velocity, the superficial velocity of the gaseous medium in the low velocity zones being within the range of 0.3 to 1.5 feet per second, the high velocity zone being composed of a plurality of restricted streams of substantial height and the superficial velocity of the restricted streams being within the range of 3.5 to 7 feet per second, whereby the catalyst will drop out of suspension in low velocity zones forming relatively dense fluidized bodies of the catalyst therein, permitting the catalyst to gravitate downwardly from the respective high density bodies to the next lower zones in annular streams surrounding the respective upwardly flowing high velocity streams of the gaseous medium and withdrawing catalyst from the lower portion of the chamber.

4. Apparatus particularly adapted to the fluid catalyst conversion of hydrocarbons which comprises an elevated vertically elongated regenerating chamber, a vertically elongated reaction chamber at an elevation lower than that of the regenerating chamber, a vertically elongated stripping chamber at an elevation lower than that of the reaction chamber, conduit means leading from the lower portion of the regenerating chamber to the upper portion of the reaction chamber, conduit means leading from the lower portion of the reaction chamber to the upper portion of the stripping chamber, conduit means leading from the lower portion of the stripping chamber, each said means being adapted to the gravity flow of fluidized catalyst therethrough, conduit means connecting the last said conduit leading from the stripping chamber with the upper portion of the regenerating chamber, a source of substantially inert gaseous medium under pressure, conduit means for connecting said source with the conduit leading to the regenerating chamber, a plurality of trays extending horizontally across the interior of the reaction chamber and so positioned as to divide the interior of the reaction chamber into a plurality of zones, said trays having uniformly disposed circular openings extending therethrough, a chimney having a substantially cylindrical body portion and flared outwardly at its lower end extending vertically through each opening from a point substantially above the tray to a point substantially below the tray, the diameter of the respective openings through the trays being greater than that of the body portion of the chimney but less than the maximum diameter of the flared lower portion of the chimney, the ratio of the total chimney area to the tray area being within the range of 1:3.5 to 1:15.

5. Apparatus particularly adapted to the fluid catalyst conversion of hydrocarbons which comprises an elevated vertically elongated regenerating chamber, a vertically elongated reaction chamber at an elevation lower than that of the regenerating chamber, a vertically elongated stripping chamber at an elevation lower than that of the reaction chamber, conduit means leading from the lower portion of the regenerating chamber to the upper portion of the reaction chamber, conduit means leading from the lower portion of the reaction chamber to the upper portion of the stripping chamber, conduit means leading from the lower portion of the stripping chamber, each said means being adapted to the gravity flow of fluidized catalyst therethrough, conduit means connecting the last said conduit leading from the stripping chamber with the upper portion of the regenerating chamber, a source of substantially inert gaseous medium under pressure, conduit means for connecting said source with the conduit leading to the regenerating chamber, a plurality of trays extending horizontally across the interior of the reaction chamber and the regenerating chamber, respectively, and so positioned as to divide the interior of the reaction chamber and regenerating chamber into a plurality of zones, said trays having uniformly disposed circular openings extending therethrough, a chimney having a substantially cylindrical body portion and flared outwardly at its lower end extending vertically through each opening from a point substantially above the tray to a point substantially below the tray, the diameter of the respective openings through the trays being greater than that of the body portion of the chimney but less than the maximum diameter of the flared lower portion of the chimney, the ratio of the total chimney area to the tray area being within the range of 1:3.5 to 1:15.

RALPH E. HALL.
MARION J. WILCOX.

REFERENCES CITED

The following references are of record in the file of this patent:

FOREIGN PATENTS

| Number | Country | Date |
| --- | --- | --- |
| 21,029 | Great Britain | Dec. 15, 1944 |